United States Patent
Panier et al.

(10) Patent No.: US 9,429,464 B2
(45) Date of Patent: Aug. 30, 2016

(54) METHOD AND DEVICE FOR ADJUSTING A WEIGHING APPARATUS

(75) Inventors: Holger Panier, Tremsbüttel (DE);
Björn Jensen, Hamburg (DE)

(73) Assignee: SECA AG, Reinach BL (CH)

( * ) Notice: Subject to any disclaimer, the term of this patent is extended or adjusted under 35 U.S.C. 154(b) by 908 days.

(21) Appl. No.: 13/635,067

(22) PCT Filed: Feb. 18, 2011

(86) PCT No.: PCT/DE2011/000166
§ 371 (c)(1),
(2), (4) Date: Nov. 7, 2012

(87) PCT Pub. No.: WO2011/113409
PCT Pub. Date: Sep. 22, 2011

(65) Prior Publication Data
US 2013/0054173 A1 Feb. 28, 2013

(30) Foreign Application Priority Data

Mar. 15, 2010 (DE) .................. 10 2010 012 640

(51) Int. Cl.
*G01G 23/01* (2006.01)
*G01G 23/00* (2006.01)
*G01G 3/14* (2006.01)

(52) U.S. Cl.
CPC .......... *G01G 23/015* (2013.01); *G01G 3/1414* (2013.01); *G01G 23/00* (2013.01); *G01G 23/01* (2013.01)

(58) Field of Classification Search
USPC ........................................ 702/101
See application file for complete search history.

(56) References Cited

U.S. PATENT DOCUMENTS

| | | | | |
|---|---|---|---|---|
| 4,512,429 A | * | 4/1985 | Meier | 177/25.14 |
| 5,878,376 A | * | 3/1999 | Schurr | 702/102 |
| 2002/0052703 A1 | | 5/2002 | Tabet | |
| 2006/0129505 A1 | * | 6/2006 | Kunde | 705/407 |
| 2008/0264141 A1 | * | 10/2008 | Kenmochi | 73/1.08 |

FOREIGN PATENT DOCUMENTS

| | | |
|---|---|---|
| GB | 2288243 | 10/1995 |
| JP | 2004325139 | 11/2004 |

* cited by examiner

*Primary Examiner* — Paul D Lee
(74) *Attorney, Agent, or Firm* — Lucas & Mercanti, LLP; Klaus P. Stoffel

(57) ABSTRACT

The method and device are used to adjust a weighing apparatus. A weight indicated by the weighing apparatus is adapted to the gravitation in the area of an installation location of the weighing apparatus. The adaptation is carried out using a code that can be evaluated by the weighing apparatus.

8 Claims, 5 Drawing Sheets

METHOD AND DEVICE FOR ADJUSTING A WEIGHING APPARATUS

The present application is a 371 of International application PCT/DE2011/000166, filed Feb. 18, 2011, which claims priority of DE 10 2010 012 640.3, filed Mar. 15, 2010, the priority of these applications is hereby claimed and these applications are incorporated herein by reference.

BACKGROUND OF THE INVENTION

The invention relates to a method for adjusting a weighing apparatus, wherein a weight indicated by the weighing apparatus is adapted to a gravity prevailing at the placement location of the weighing apparatus.

Such weighing apparatus are typically constructed as scales and can be used for weighing persons or objects. In the case of scales which are used in the medical field, an adjustment and possibly a calibration are necessary.

The weight indicated by the scale is dependent upon the mass of the object to be weighed, as well as on the local Earth's gravity. In this connection, the Earth's gravity is not constant at all locations of the Earth's surface, but varies locally to an extent that deviations within the intended measurement resolution for the weight occur.

In accordance with the state of the art, the Earth's gravity prevailing at the intended placement location can be taken into consideration by various measures. On the one hand, it is possible to carry out an individual manufacture of the scale taking into consideration the intended placement location. This results in comparatively high manufacturing costs. In accordance with another variation, it is possible to manufacture the scale in accordance with a predetermined standard and once again to adjust, and possibly calibrate, the scale at the actual location of operation. This results in high costs for the user of the scale and frequently in long delays to start operation of the scale.

In accordance with an automated method, it is known to equip the scale with a GPS receiver and to thereby determine the actual placement location. The local Earth's gravity can then be determined in accordance with an approximation formula, or can be read from a stored table. This method also results in high manufacturing costs and requires the possibility of setting up a satellite connection.

In accordance with a simpler method, the geographic position is entered manually and the local Earth's gravity is computed through an approximation formula. In the case of input errors, this method results in incorrect measurements and, moreover, makes possible intentional manipulations of the indicated values. Accordingly, a use under calibrating conditions is not possible.

When data concerning the placement location and a subsequent computation of the Earth's gravity with the use of an approximation formula are scanned in, as is also conceivable, the same disadvantages occur as for the manual input already discussed above.

SUMMARY OF THE INVENTION

It is the object of the present invention to indicate a method of the above mentioned type so that a simple and manipulation safe adjustment of the weighing apparatus is reinforced.

In accordance with the invention, this object is met in that the adjustment is carried out with the use of a code which can be evaluated by the weighing apparatus.

Another object of the present invention is to construct a device of the above mentioned type in such a way that a simple and manipulation safe adjustment of the weighing apparatus is reinforced.

In accordance with the invention, this object is met in that the device has an input device for a code and an evaluating device for transforming the code into a correction factor, which adapts the indicated weight to the locally prevailing gravity.

By adjusting the weighing apparatus with the use of a code which can be entered, it is possible to carry out the manufacture of the scale universally and independently of the intended placement location. An adaption of the scale to the Earth's gravity prevailing in the area of the intended use takes place only by the user of the scale or the respective merchant.

A typical embodiment is made available if the code corresponds to a value for the local Earth's gravity prevailing at the location of use.

By assigning the code individually to a specific weighing apparatus, a capability of being calibrated is being reinforced.

For providing a high use safety, it is proposed that a code is used which is safe with respect to manipulation.

For individually assigning the code to a specific device, it is proposed that the code is coupled to a serial number of the weighing apparatus.

The data safety can be even further increased by encoding the code.

A universal possibility of use is reinforced by entering the code manually into the weighing apparatus.

An increased ease of operation can be achieved by entering the code electronically into the weighing apparatus.

Another improvement of the manipulation safety can be achieved in that the code is entered exactly once into the weighing apparatus.

BRIEF DESCRIPTION OF THE DRAWING

In the drawings, embodiments of the invention are illustrated schematically. In the drawing.

DETAILED DESCRIPTION OF THE INVENTION

Figure 1:
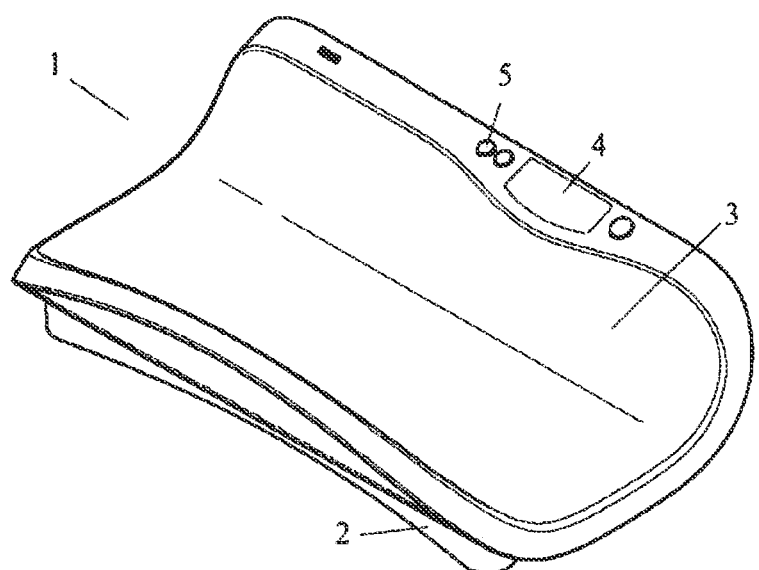
FIG. 1 is a perspective view of a baby scale.

FIG. 1 shows a perspective view of a weighing apparatus 1. The weighing apparatus 1 is in this embodiment constructed as a baby scale. The weighing apparatus 1 consists essentially of a base element 2 and a support element 3. For indicating information, particularly for indicating the measured weight, a display 4 is provided. An adjustment of the weighing apparatus 1 can be effected with the use of adjusting elements 5.

Figure 2:
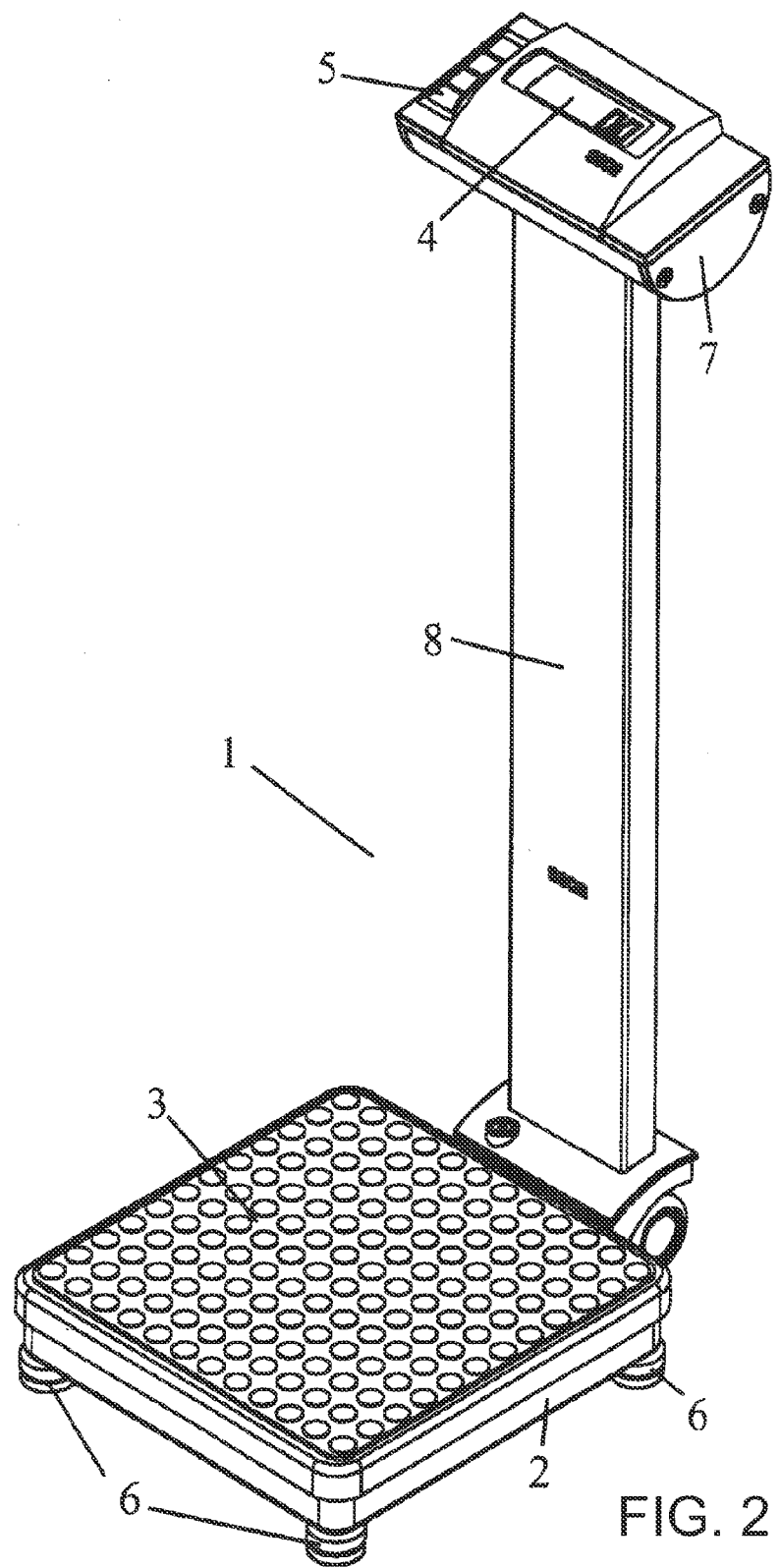
FIG. 2 is a perspective view of a personal scale with raised indicator and control field.

The embodiment according to FIG. 2 shows a weighing apparatus 1 in which the support element 3 is constructed as a standing surface for a person to be weighed. For reinforcing a horizontal alignment, the base element 2 has legs 6. Operability is reinforced by arranging the display 4 and the adjusting elements 5 in the area of a console 7 which is supported on a column 8 and positioned at an ergonomically favorable viewing and operating height.

Figure 3:
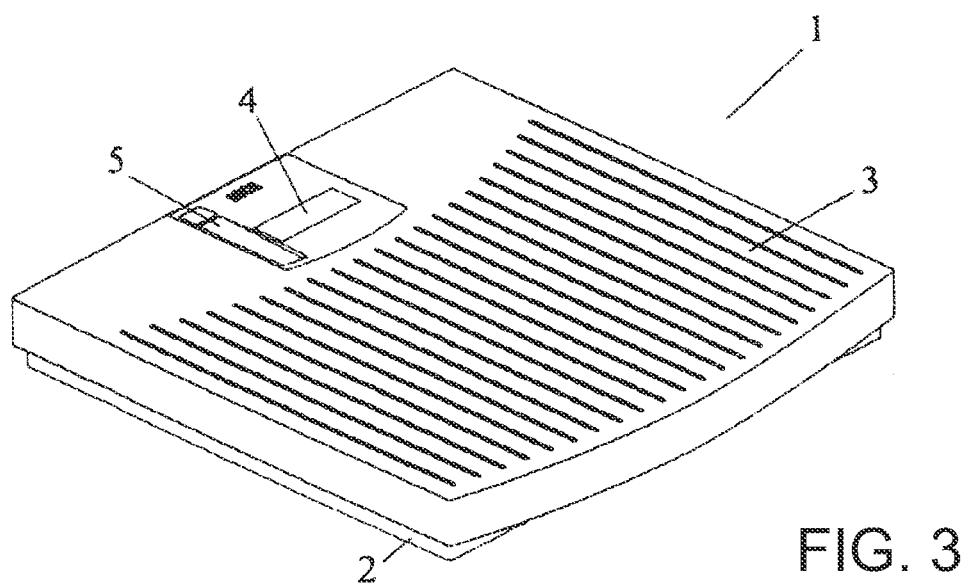
FIG. 3 is a perspective view of a floor scale.

FIG. 3 shows another embodiment of a weighing apparatus 1 which is constructed as a floor scale. Also in this case, a display 4 and adjusting elements 5 are provided.

Figure 4:
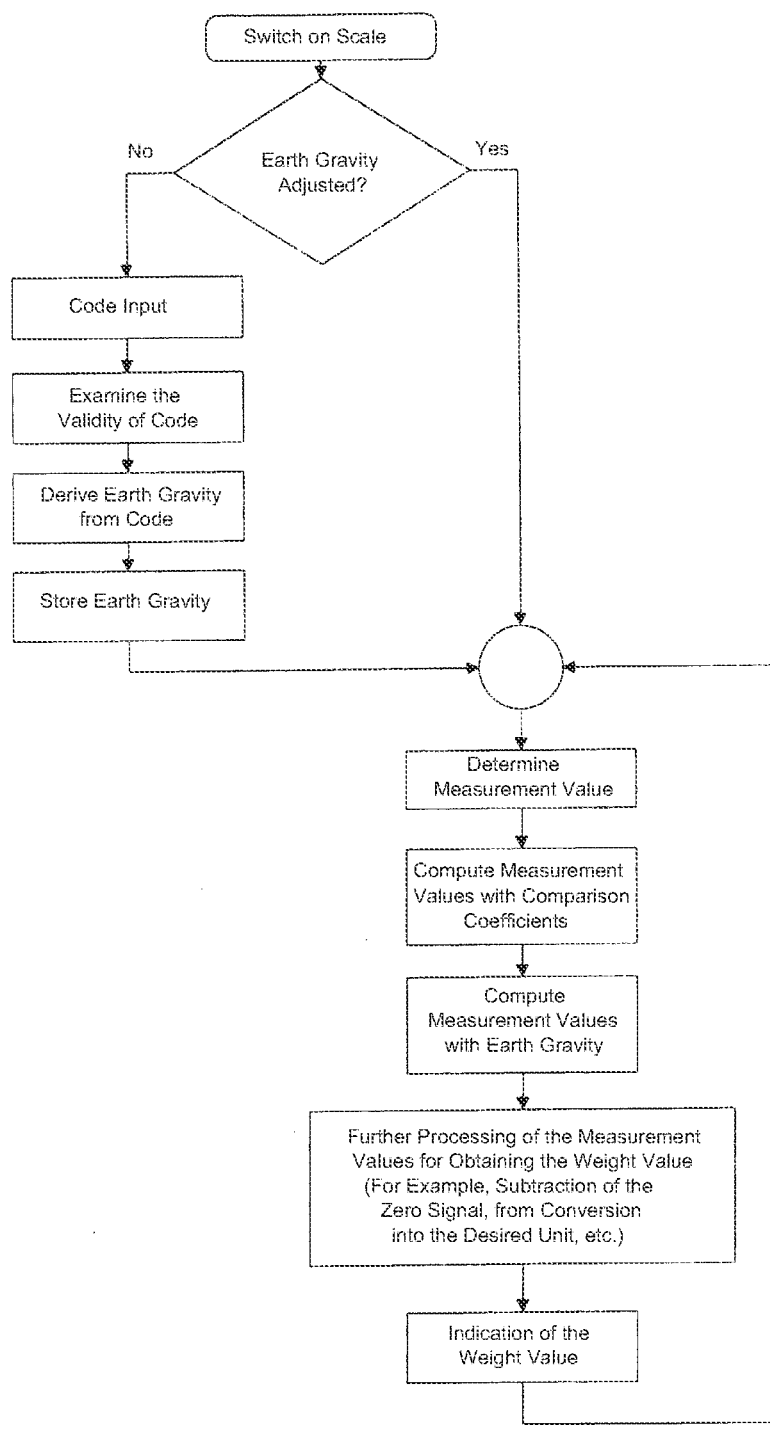
FIG. 4 is a flow diagram for illustrating the evaluation of the code.

FIG. 4 illustrates the sequence of functions for adapting the respective weighing apparatus to a locally existing GAL value. This adaptation takes place typically precisely once when the weighing apparatus 1 is started up. After each switching on of the weighing apparatus 1, it is checked whether this initial adjustment has already taken place. If this should not be the case, an input possibility for a respective code is made available, and the validity of the code is examined. In the event of a valid code, the Earth's gravity is derived from the code and is stored.

If such an adjustment has already taken place, the measuring process is started immediately. When carrying out the measuring process, the measurement value is determined, and the determined measurement value is computed with an assigned comparison coefficient. Subsequently, a computation takes place with the locally valid Earth's gravity determined when evaluating the code.

The raw measurement values made available as a result can be subjected to subsequent processing. For example, a zero signal can be subtracted, or a transformation into the desired unit can take place. The determined measurement value is then displayed in the area of the display 4.

Figure 5:
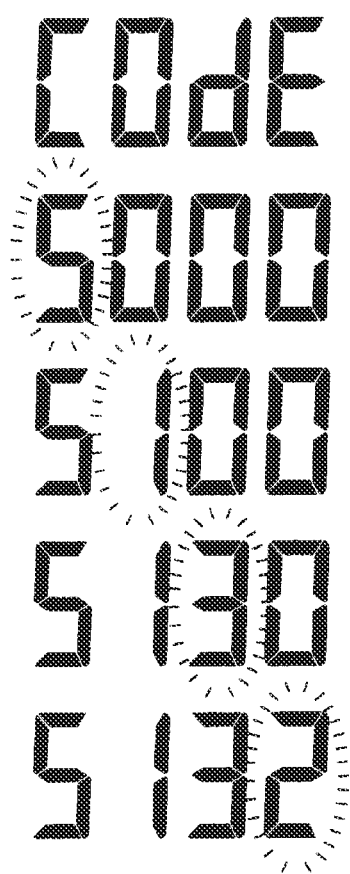
FIG. 5 shows an example for a simplified code input.

FIG. 5 shows by way of example the sequential input of a code.

Figure 6:
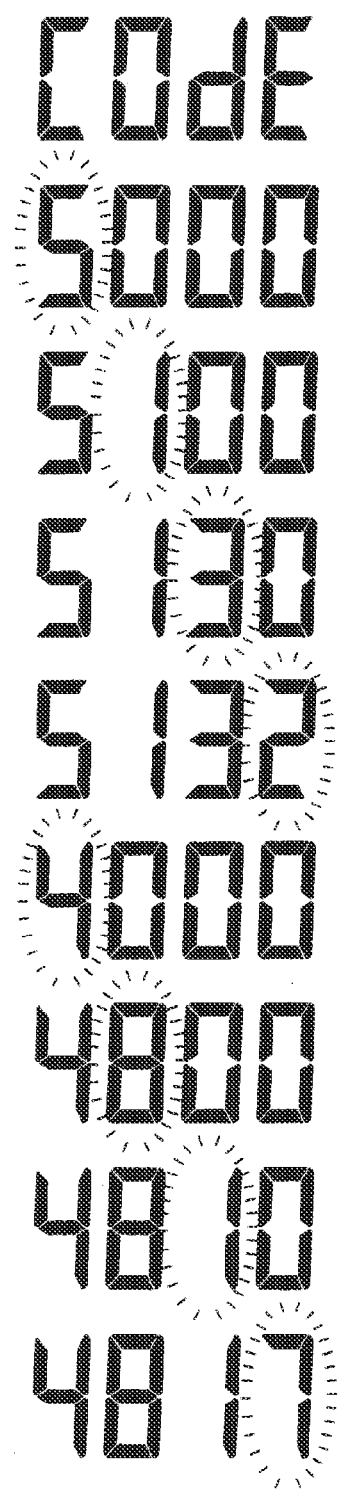
FIG. 6 shows an example of a complex code input.

In the embodiment according to FIG. 6, a complex code input takes place, wherein additionally, for example, the serial number of the respective device is entered. This makes available an increased input safety.

Alternatively or as a supplement to including the serial number in the code, it is also possible to form a test sum over the serial number and to include this test sum in the code. For example, the test sum can be determined as CRC. The inclusion of the test sum into the code makes it possible to shorten the code and to still prevent an activation of a scale with a code which does not belong to this scale. This is also true if no clear assignment between the code and the scale is present.

As an alternative to the manual input of the code using the display 4 and/or the adjusting elements 5, it is also possible to carry out an automated input. For example, this can take place with the use of an RFID chip which is placed in the weighing apparatus 1. The RFID chip can be operated by the manufacturer or authorized merchant with the code, or also only with the respective GAL value. A manipulation protection can be effected by using test sums. Typically, a single reading of the RFID chip takes place when the weighing apparatus 1 is first started up.

Further embodiments are being made available, for example, by an input of the code to a PC which is connected to the weighing apparatus 1, either through cable or wirelessly. Also possible is an input with the use of a Bluetooth connection, for example, by mobile telephone. Another embodiment resides in connecting the weighing apparatus 1 through the Internet to an authorized communication partner, and to transmit the code in this manner to the weighing apparatus 1. Further embodiments reside in using a storage medium of a different type for the code, for example, a USB stick or a chip card. Moreover, the use of scanners or RFID reading devices is also being considered. Also, a speech input is possible. An input to the weighing apparatus 1, in accordance with circuit technology, can be effected with the use of jumpers.

In dependence on the above described different variations for the input of the code into the weighing apparatus 1, different possibilities for making available the code exist. For example, the code can be printed out and added to the delivery documents. It is also possible to provide the code on the packaging of the weighing apparatus. In accordance with another variation, the code is made available online, and is entered by the user for calling up the serial number of the device or of the delivery document number.

As an alternative to an input by the end user, the input can also be made by a merchant who obtains the code from the manufacturer and programs the scale, or passes on the code to the respective client. The code can also be called up by telephone or SMS. The RFID chip, already mentioned above, can be inserted into the scale either at the location of use or may be provided already by the manufacturer.

A manipulation safety of the code or the adjustment of the scale in dependence to the entered code can be effected through different measures. One variation is the already above described inclusion of the serial number of the weighing apparatus into the code, or an inclusion of another type of unequivocal characterization. An inclusion of the serial number can be effected either by taking into consideration the complete serial number, or a test number to be derived from the serial number. In the case of all different variations for making available the code, the code can be encoded.

The accuracy of making available the concrete Earth's gravity can be indicated in dependence on its use. In particular it is contemplated to quantify the available values of the Earth's gravity in such a way that the respective value is obtained by adding a base value and a difference value. The difference value results from the multiplication of a reference value and an adjustment factor, wherein the adjustment factor is a whole number. The base value is selected in such a way that the necessary area is covered, and the reference value is selected in such a way that the necessary resolution is achieved.

The invention claimed is:

1. A method for adjusting a weighing apparatus, comprising the steps of: displaying a weight on a display, wherein the weight is dependent upon mass of an object being weighed and gravity; modifying the weight indicated by the display by carrying out a computation using local gravity prevailing in an area of a placement location of the weighing apparatus, wherein the adaptation is carried out using a code which can be evaluated by the weighing apparatus, including coupling the code with a serial number of the weighing apparatus to prevent tampering with the weighing apparatus, wherein the code is encoded, wherein the code is transformed into a correction factor for a measure weight so that the correction factor takes into account the local gravity, the modifying step including multiplying the measured weight by the correction factor to determine the indicated weight; decoding the encoded code with an evaluating device; and checking the validity of the decoded code with the evaluating device.

2. The method according to claim 1, wherein the code corresponds to a value for the local Earth's gravity prevailing at the placement location.

3. The method according to claim 1, including assigning the code individually to a specific weighing apparatus.

4. The method according to claim 1, including using a manipulation secure code.

5. The method according to claim 1, including manually inputting code into the weighing apparatus.

6. The method according to claim 1, including electronically inputting code into the weighing apparatus.

7. The method according to claim 1, wherein the input of the code into the weighing apparatus can be effected exactly once.

8. A weighing apparatus with a display and an adjusting device, wherein a weight indicated on the display by the weighing apparatus is modified by factoring in gravity prevailing in an area of a placement location of the weighing apparatus, wherein the adjusting device includes an input device for a code and an evaluating device for converting the code into a correction factor that modifies the indicated weight using the locally prevailing gravity, the measured weight being multiplied by the correction factor to determine the indicated weight, wherein the code is encoded and coupled with a serial number of the weighing apparatus to prevent tampering with the weighing apparatus, wherein the evaluating device is constructed to decode the coding of the code and to check the validity of the decoded code.

* * * * *